United States Patent
Shimada et al.

(10) Patent No.: US 9,013,899 B2
(45) Date of Patent: Apr. 21, 2015

(54) CONSTANT CURRENT POWER SUPPLY APPARATUS

(75) Inventors: Masaaki Shimada, Niiza (JP); Yoshimichi Tadamasa, Niiza (JP)

(73) Assignee: Sanken Electric Co., Ltd., Saitama (JP)

( * ) Notice: Subject to any disclaimer, the term of this patent is extended or adjusted under 35 U.S.C. 154(b) by 36 days.

(21) Appl. No.: 13/397,489

(22) Filed: Feb. 15, 2012

(65) Prior Publication Data
US 2012/0243272 A1 Sep. 27, 2012

(30) Foreign Application Priority Data
Mar. 23, 2011 (JP) ................. 2011-063849

(51) Int. Cl.
*H02M 3/335* (2006.01)
*H05B 33/08* (2006.01)

(52) U.S. Cl.
CPC ....... *H02M 3/33507* (2013.01); *H05B 33/0824* (2013.01); *H05B 33/0815* (2013.01)

(58) Field of Classification Search
CPC .................................. H02M 3/33507
USPC ........ 323/282; 363/21.15, 21.12, 21.1, 21.07, 363/21.17, 21.18, 18, 16, 21.09, 21.13, 363/21.11
See application file for complete search history.

(56) References Cited

U.S. PATENT DOCUMENTS

| 6,163,115 | A  | * | 12/2000 | Ishizuka ....................... 315/308 |
| 6,353,544 | B1 | * | 3/2002  | Lau ............................. 363/21.14 |
| 7,414,373 | B2 | * | 8/2008  | Cho ............................... 315/307 |
| 2009/0185397 | A1 | * | 7/2009 | Forghani-zadeh et al. ..... 363/18 |
| 2011/0255311 | A1 | * | 10/2011 | Hsu et al. ................... 363/21.15 |

FOREIGN PATENT DOCUMENTS

| JP | 2004-147435 A | 5/2004 |
| JP | 2005-45850 A  | 2/2005 |
| JP | 2005-142137 A | 6/2005 |
| JP | 2010-62184 A  | 3/2010 |
| JP | 2011-9701 A   | 1/2011 |

\* cited by examiner

*Primary Examiner* — Matthew Nguyen
*Assistant Examiner* — Trinh Dang
(74) *Attorney, Agent, or Firm* — Birch, Stewart, Kolasch & Birch, LLP

(57) ABSTRACT

A constant current power supply apparatus is provided which can drive a load with a constant current, even if the circuit configuration is such that a time delay is generated in the feedback control of a converter, or the like. An FB period restricting circuit including an ON generation circuit, OR circuit, inverter, and PMOS restricts the period during which an FB signal is fed back, to the logical sum of the ON period of an SW signal for driving an LED array on and a replenishment period generated by the OR circuit based on the SW signal. An FB signal generation circuit including a differential amplifier, NMOS, reference voltage, capacitor, and shunt regulator generates, in the replenishment period other than the ON period of the SW signal, an FB signal corresponding to an output current having flown through the LED array during the ON period of the SW signal.

7 Claims, 7 Drawing Sheets

CONSTANT CURRENT POWER SUPPLY APPARATUS

BACKGROUND OF THE INVENTION

1. Field of the Invention

The present invention relates to a constant current power supply apparatus for driving a load with a constant current, and particularly relates to a constant current power supply apparatus for driving a load with a periodic pulse signal under PWM (Pulse Width Modulation) control.

2. Description of the Related Art

The LED (Light Emitting Diode) has a feature that it changes the color tone in response to the magnitude of a current. Therefore, in the case where an LED is driven as a load while performing dimming control, the LED is generally driven on/off with a pulse signal under PWM control for adjusting the quantity of light by the duty ratio for the pulse signal.

On the other hand, in the case where a switching power supply is used as a constant current power supply apparatus for driving the load with a constant current, it is necessary to detect the output current for performing the feedback control. In the case where an LED is driven as a load under PWM control as described above, the LED will repeat the turn-on period and the turn-off period, and understandably, in the turn-off period, no current is passed through the LED, resulting in the output current being fed back as a zero current. If the output current is thus fed back as a zero current, too much electric power is supplied; then in order to prevent an excessive amount of electricity from being supplied, it has been proposed to perform the feedback control only in the period during which the LED is turned on (for example, Patent Documents 1 and 2 to be referenced).

With Patent Document 1, when the N-type MOS transistor for turning the LED on/off is on, the electric power is supplied from the switching power supply to the LED, and the output current flowing through the LED is detected for performing the constant current control. In addition, when the N-type MOS transistor is off, the supply of electric power from the switching power supply to the LED is halted.

With Patent Document 2, the period during which a current flows in the LED and the period during which no current flows in the LED are used to alter the minimum off-period for a switching device in the switching power supply. Specifically, the minimum off-period is set at such a length that, in the period during which no current flows in the LED, the switching device is fully off for halting the supply of electric power to the LED.

CITATION LIST

Patent Literature

[Patent Document 1]
Japanese Unexamined Patent Application Publication No. 2004-147435
[Patent Document 2]
Japanese Unexamined Patent Application Publication No. 2005-45850

The prior art is based on the non-isolation type converter method, using no transformer, and the output current flowing through the LED can be directly detected for grasping it as a control signal, however, with the prior art, there has been a problem that, in the case where the prior art is applied to the isolation type converter method which isolates between the primary and the secondary through a transformer, a delay of the feedback control is generated by a photocoupler or a control circuit used, resulting in impossibility of the load being driven with a constant current.

FIG. 6 is a circuit configuration diagram illustrating a circuit configuration of a conventional constant current power supply apparatus, and FIG. 7 is a waveform diagram illustrating signal waveforms and operation waveforms of the respective components in FIG. 6.

FIG. 6 shows a circuit configuration where the isolation type converter method which isolates between the primary and the secondary through a transformer T is adopted in the conventional constant current power supply apparatus. To AC input terminals ACin1 and ACin2 for a rectifier circuit DB in which diodes are bridge-configured is connected a commercial alternating current power supply AC, and an alternating voltage input from the commercial alternating current power supply AC is output from the rectifier circuit DB, being full-wave rectified. Across the rectified output positive electrode terminal of the rectifier circuit DB and the rectified output negative electrode terminal is connected a smoothing capacitor C1. Thereby, direct-current power can be obtained as a result of rectifying and smoothing the commercial alternating-current power AC with a rectifier circuit DB and a smoothing capacitor C1.

The rectified output negative electrode terminal of the rectifier circuit DB is connected to a ground terminal, and is connected to the source terminal of an N-type MOSFET (hereinafter, referred to as an NMOS) Q1, which is a switching device, through a resistor R1, and the drain terminal of the NMOSQ1 is connected to the rectified output positive electrode terminal of the rectifier circuit DB through the primary side winding of the transformer T. In addition, the gate terminal of the NMOSQ1 is connected to a gate control terminal G of a controller 1, and with the controller 1 controlling the NMOSQ1 on/off, the direct current power which has been rectified and smoothed with the rectifier circuit DB and the smoothing capacitor C1 is switched with the NMOSQ1 to be applied to the primary side winding of the transformer T.

When the NMOSQ1 is on, magnetic energy is stored in the transformer T, while when the NMOSQ1 is off, the stored magnetic energy is discharged from the secondary side winding of the transformer T as electric power. Across both terminals of the secondary side winding of the transformer T, a smoothing capacitor C2 is connected through a rectifying diode D1, and the electric power discharged from the secondary side winding of the transformer T is rectified and smoothed by the rectifying diode D1 and the smoothing capacitor C2. The line connected to the positive electrode terminal of the smoothing capacitor C2 provides a power line, while the line connected to the negative electrode terminal of the smoothing capacitor C2 provides a GND line which is connected to the ground terminal.

An LED array 2 which is an object to be driven, being constituted by n LEDs 21 to 2n (n denotes a natural number) connected in series, an NMOSQ2, and a resistor R2 are connected in series between the power line and the GND line. The anode side terminal of the LED array 2 is connected to the power line; the drain terminal of the NMOSQ2 is connected to the cathode side terminal of the LED array 2; and the source terminal of the NMOSQ2 is connected to the GND line through the resistor R2. In addition, the gate terminal of the NMOSQ2 is connected to the input terminal SW to which an SW signal is input, and by turning the NMOSQ2 on/off with the SW signal, which is a pulse signal given by the PWM control, the LED array 2 is driven on/off.

A feedback circuit 3 is connected to a connection point between the source terminal of the NMOSQ2 and the resistor R2, and connected to the input terminal SW, and to the feedback circuit 3, a voltage generated across the resistor R2 is input as a detection signal of an output current ID1 flowing through the LED array 2, and an SW signal is input. In the feedback circuit 3, an error signal as a result of comparison between the internal reference signal and the detection signal input is generated as a feedback signal (hereinafter, referred to as an FB signal). The generated FB signal is fed back to an FB input terminal of the controller 1 through an isolation interface circuit 4, such as a photocoupler, or the like, in the ON period of the SW signal. Thereby, the controller 1 generates a PWM signal having a pulse width in response to the FB signal for controlling the NMOSQ1 on/off so as to keep the output current ID1 at a preset constant current Is.

In the case where a circuit configuration in which the primary side and the secondary side are thus isolated from each other is adopted, there is generated a time delay in the feedback control for feeding back an FB signal from the secondary side to the primary side. In other words, as a way of transmitting an FB signal from the secondary side to the primary side, the isolation interface circuit 4 is used. As the isolation interface circuit 4, a photocoupler is generally used, and the signal transfer characteristic of the photocoupler generates a time delay of a few 10 µs to a few 100 µs. In addition, the responsiveness of the error amplifier contained in the controller 1 for controlling the NMOSQ1 varies, and therefore the time delay of the feedback control varies depending upon the characteristic of the controller 1.

FIG. 7 illustrates signal waveforms and operation waveforms of the respective components in FIG. 6, (a) denoting an SW signal for driving the NMOSQ2; (b) an output current ID1 flowing through the LED array 2; (c) an FB signal fed back from the secondary side to the primary side; (d) an output voltage Vdd across both terminals of the smoothing capacitor C2; and (e) an output current ID2 flowing through the NMOSQ1. In addition, the period A indicates a period with which the dimming is set at a higher brightness level, the ON period for the SW signal being relatively long, while the period B a period with which the dimming is set at a lower brightness level, the ON period for the SW signal being relatively short.

As shown in FIG. 7 (a), after the SW signal rises at time T1, there is given a time period of time T1 to time T2, which is a period corresponding to the time delay of the feedback control, during which the feedback control will not be started, and as shown in FIG. 7 (c), no FB signal will be fed back from the secondary side to the primary side until time T2 . Therefore, in the period from time T1 to time T2, no electric power will be supplied from the primary side to the smoothing capacitor C2, and the LED array 2 will be driven only by the electric power accumulated in the smoothing capacitor C2, thereby as shown in FIG. 7 (d) and (b), the output voltage Vdd remains lower than the rated voltage, and the output current ID1 for driving the LED array 2 remains lower than the steady current Is.

Next, at time T2, the feedback control is started, however, the output current ID1 remains lower than the constant current Is, thus as shown in FIG. 7 (c) and (e), the FB signal to be fed back to the primary side rapidly rises to provide an abrupt feedback control for raising the output current ID1 which remains lower, thereby a larger-than-normal amount of electric power is supplied from the primary side to the secondary side. In the case where the ON period of the SW signal is relatively long as with the period A, a sufficient amount of electric power is supplied from the primary side to the smoothing capacitor C2 at time T3, and once the output voltage Vdd reaches the rated voltage, the feedback control is performed such that the output current ID1 is maintained, the output voltage Vdd being maintained at the rated voltage and the output current ID1 being at the constant current Is until the SW signal falls at time T4.

Contrarily to this, in the case where the ON period of the SW signal is relatively short as with the period B, in other words, the SW signal falls at time T5, which is prior to time T3, a sufficient amount of electric power is not supplied from the primary side to the smoothing capacitor C2, thereby before the output voltage Vdd reaches the rated voltage, the supply of electric power from the primary side to the secondary side is terminated. Thereby, the output current ID1 which remains lower will not attain the constant current Is, resulting in impossibility of driving the LED array 2, a load, with the constant current Is.

In addition, over a time period of time T2 to T3, a larger-than-normal amount of electric power is supplied from the primary side to the secondary side, thereby there has been a problem that the change in switching current is increased, resulting in the amount of change in magnetic flux of the transformer T being increased, which causes the transformer T to produce an increased resonance sound.

In view of the aforementioned problems of the prior art, the present invention has been made to solve such problems and provide a constant current power supply apparatus which, even with a circuit configuration involving a time delay in the feedback control of a converter, or the like, allows the load to be driven with a constant current.

SUMMARY OF THE INVENTION

According to an aspect of the present invention, there is provided a constant current power supply apparatus, supplying electric power from a primary side to a secondary side, and using the electric power supplied to the secondary side for driving a load on/off with a pulse signal under PWM control, the constant current power supply apparatus comprising: a feedback signal generator circuit for generating a feedback signal corresponding to an output current flowing through the load; a feedback circuit for feeding back the feedback signal generated in the feedback signal generator circuit from the secondary side to the primary side; a control circuit for controlling the supply of electric power from the primary side to the secondary side on the basis of the feedback signal fed back by the feedback circuit; and a feedback period restricting circuit for restricting the period during which the feedback signal is fed back, the feedback period restricting circuit restricting the period during which the feedback signal is fed back, to the logical sum of the ON period of the pulse signal during which the load is driven on, and a replenishment period generated on the basis of the pulse signal.

According to another aspect of the present invention, there is provided a constant current power supply apparatus, wherein, in the replenishment period other than the ON period of the pulse signal, the feedback signal generator circuit generates the feedback signal corresponding to the output current having flown through the load in the ON period of the pulse signal immediately before the replenishment period.

According to another aspect of the present invention, there is provided a constant current power supply apparatus, wherein the replenishment period is a predetermined period which is generated with the timing of the termination of the ON period of the pulse signal being used as a trigger.

According to another aspect of the present invention, there is provided a constant current power supply apparatus, wherein the replenishment period is a predetermined period which is generated with the timing of the start of the ON period of the pulse signal being used as a trigger.

According to another aspect of the present invention, there is provided a constant current power supply apparatus, wherein the replenishment period is a period which is generated by delaying the ON period of the pulse signal.

According to another aspect of the present invention, there is provided a constant current power supply apparatus, wherein, in the replenishment period other than the ON period of the pulse signal, the electric power to be used for driving the load in the period of the time delay of the feedback control that is attributable to the feedback circuit and the control circuit is supplied from the primary side to the secondary side.

DETAILED DESCRIPTION OF THE PREFERRED EMBODIMENT

Next, embodiments of the present invention will be specifically explained with reference to the drawings.
(First Embodiment)

Figure 1:
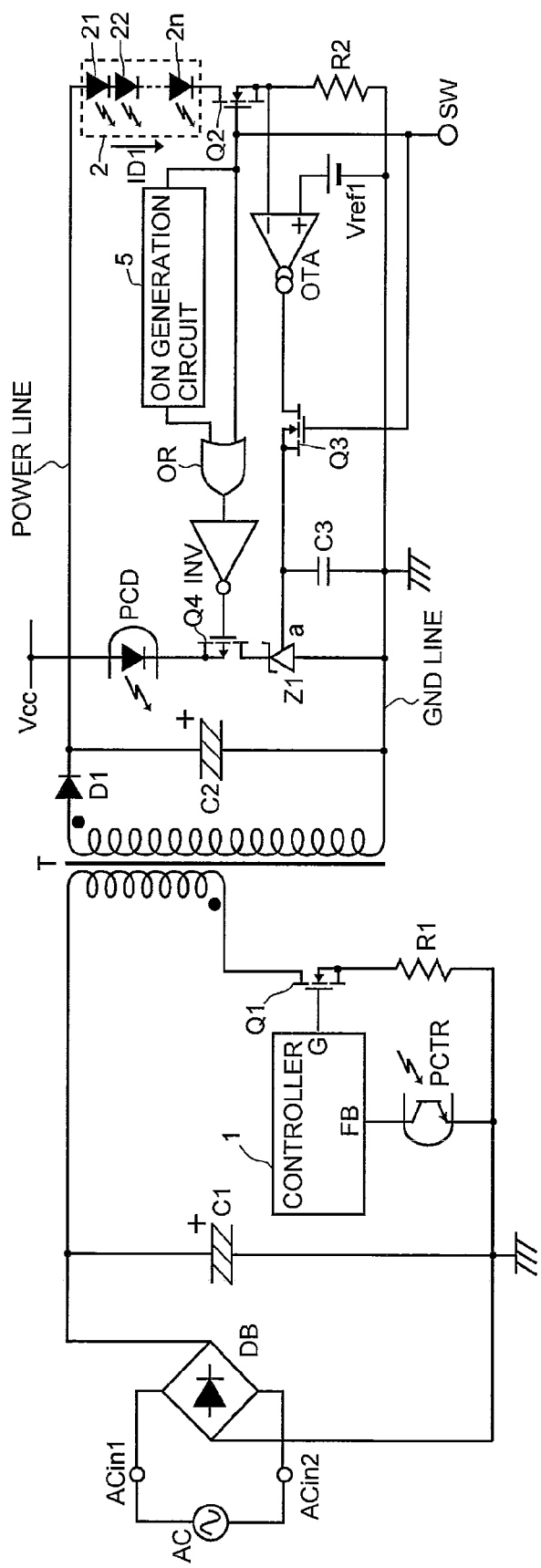
FIG. 1 is a circuit configuration diagram illustrating a circuit configuration of a first embodiment of a constant current power supply apparatus according to the present invention.
Figure 6:
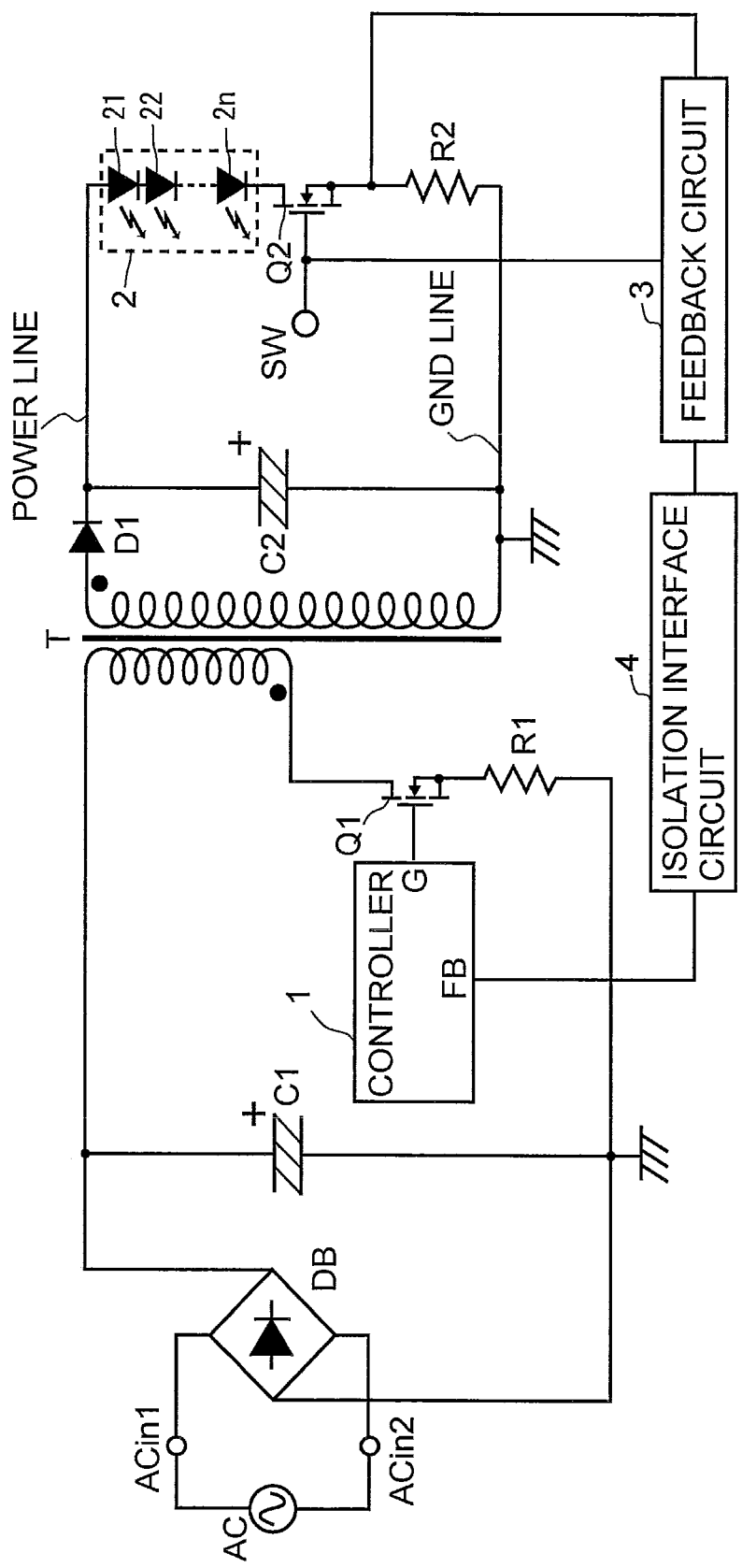
FIG. 6 is a circuit configuration diagram illustrating a circuit configuration of a constant current power supply apparatus of the prior art.
Figure 7:
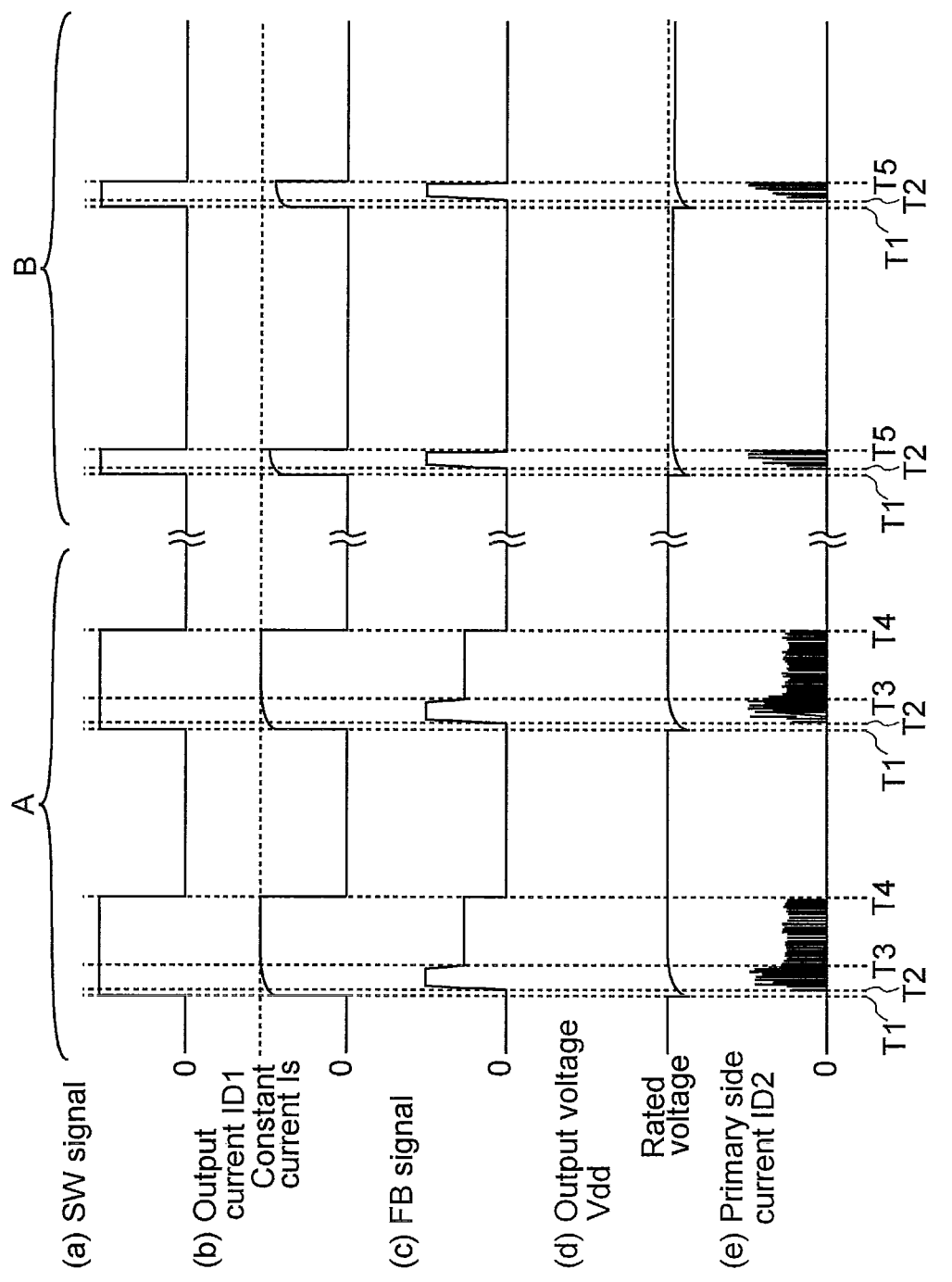
FIG. 7 is a waveform diagram illustrating signal waveforms and operation waveforms of the respective components in FIG. 6.

A constant current power supply apparatus of a first embodiment includes, as shown in FIG. 1, a rectifier circuit DB; a smoothing capacitor C1; a controller 1; an N-type MOSFET (hereinafter, referred to as an NMOS) Q1; a resistor R1; a transformer T; a rectifying diode D1; a smoothing capacitor C2; a resistor R2; an NMOSQ2; a differential amplifier OTA; an NMOSQ3; a reference voltage Vref1; a capacitor C3; a shunt regulator Z1; an ON generation circuit 5; an OR circuit OR; an inverter INV; a P-type MOSFET (hereinafter, referred to as a PMOS) Q4; a light-emitting diode PCD; and a photocoupler constituted by a photo transistor PCTR, the constant current power supply apparatus being configured such that the LED array 2 is driven with a constant current Is. In the constant current power supply apparatus of the first embodiment, the same component as that of the conventional constant current power supply apparatus shown in FIG. 6 is provided with the same reference symbol, the explanation thereof being omitted.

The differential amplifier OTA, the NMOSQ3, the reference voltage Vref1, the capacitor C3, and the shunt regulator Z1 function as an FB signal generation circuit which generates an FB signal corresponding to the output current ID1 flowing through the LED array 2. In addition, the photocoupler constituted by the light-emitting diode PCD and the photo transistor PCTR function as a feedback circuit which feeds back the FB signal generated in the FB signal generation circuit from the secondary side to the primary side. Further, the controller 1 functions as a control circuit which controls the supply of electric power from the primary side to the secondary side on the basis of the FB signal fed back by the feedback circuit, and with the FB signal being input to the controller 1, the controller 1 starts the supply of electric power from the primary side to the secondary side, while halting the supply of electric power from the primary side to the secondary side with the FB signal received by the photo transistor PCTR being eliminated. Furthermore, the ON generation circuit 5, the OR circuit OR, the inverter INV, and the PMOSQ4 function as a feedback period restricting circuit which restricts the period during which the FB signal is fed back.

As shown in FIG. 1, a connection point between the source terminal of the NMOSQ2 and the resistor R2 is connected to the inverting input terminal of the differential amplifier OTA, and the non-inverting input terminal of the differential amplifier OTA is connected to the positive electrode terminal of the reference voltage Vref1. The differential amplifier OTA converts the differential voltage between the reference voltage Vref1 input to the non-inverting input terminal and a voltage generated across the resistor R2 that is input to the inverting input terminal into a current for outputting it. Thereby, the differential amplifier OTA will output a current which is in proportion to the output current ID1 flowing through the LED array 2. The output terminal of the differential amplifier OTA is connected to the drain terminal of the NMOSQ3, and the source terminal of the NMOSQ3 is connected to the GND line through the capacitor C3, while being connected to the control terminal 'a' of the shunt regulator Z1. The gate terminal of the NMOSQ3 is connected to the input terminal SW for an SW signal.

In addition, the input terminal SW is connected to one input terminal of the OR circuit OR, while the input terminal SW being connected to the other input terminal of the OR circuit OR through the ON generation circuit 5. And, the output terminal of the OR circuit OR is connected to the gate terminal of the PMOSQ4 through the inverter INV. The ON generation circuit 5 is a circuit for generating a replenishment period on the basis of the SW signal, and by the logical sum of the ON period of the SW signal and the replenishment period generated by the ON generation circuit 5, the PMOSQ4 is controlled on/off.

The anode of the shunt regulator Z1 is connected to the GND line, while the cathode of the shunt regulator Z1 is connected to the drain terminal of the PMOSQ4. And, the source terminal of the PMOSQ4 is connected to the cathode of the light-emitting diode PCD constituting the photocoupler, while the anode of the light-emitting diode PCD is connected to the internal constant power supply Vcc.

With the aforementioned configuration, in the case where the NMOSQ3 is in the on-state, a current in response to the differential voltage between the reference voltage Vref1 and a voltage generated across the resistor R2 is output from the differential amplifier OTA, and a voltage generated across the capacitor C3, i.e., a voltage in response to the output current ID1 is input to the control terminal 'a' of the shunt regulator Z1. In the case where the PMOSQ4 is in the on-state, a current in response to the voltage at the control terminal 'a' of the shunt regulator Z1, i.e., a current corresponding to the output current ID1 flows through the light-emitting diode PCD, the relevant current being output from the light-emitting diode PCD to the photo transistor PCTR as an FB signal. The PMOSQ4 is brought into the on-state when the inverter INV is placed at a Low level, in other words, the OR circuit OR is at a Hi level, and the period during which an FB signal is fed back is restricted to the logical sum of the ON period of the SW signal and the replenishment period generated in the ON generation circuit 5.

The collector terminal of the photo transistor PCTR is connected to the feedback input terminal FB of the controller 1, while the emitter terminal of the photo transistor PCTR being connected to the ground terminal. With the photo transistor PCTR, when an error signal from the light-emitting diode PCD is received, a current in response to the FB signal received flows therethrough, the FB signal being transmitted to the controller 1. Thereby, the controller 1 generates a PWM signal having a pulse width in response to the FB signal to thereby control the NMOSQ1 on/off for supplying the necessary electric power from the primary side to the secondary side such that the LED array 2, which is a load, is driven with a constant current Is.

Figure 2:
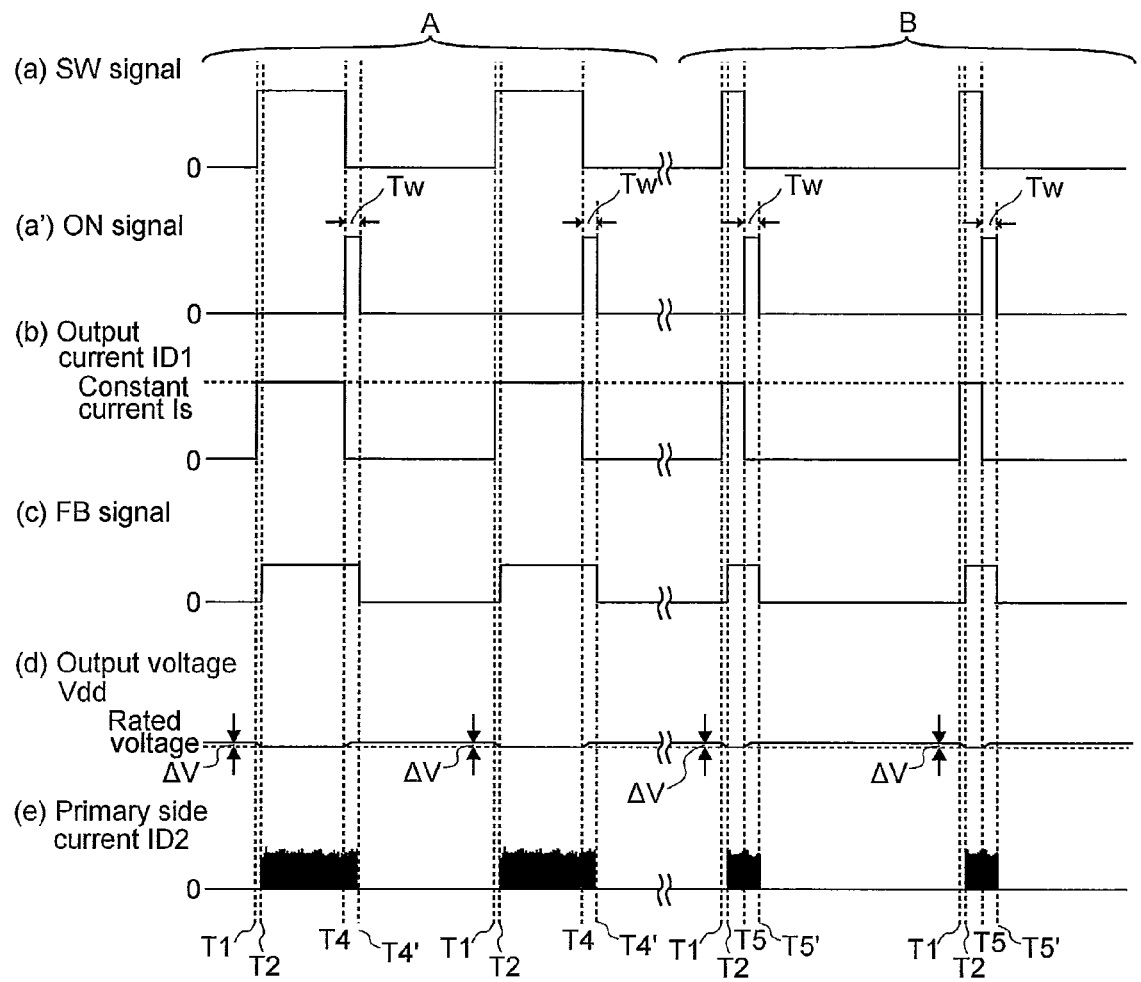
FIG. 2 is a waveform diagram illustrating signal waveforms and operation waveforms of the respective components in FIG. 1.

FIG. 2 illustrates signal waveforms and operation waveforms of the respective components in FIG. 1, (a) denoting an SW signal for driving the NMOSQ2; (a') an ON signal output from the ON generation circuit 5; (b) an output current ID1 flowing through the LED array 2; (c) an FB signal fed back from the secondary side to the primary side; (d) an output voltage Vdd across both terminals of the smoothing capacitor C2; and (e) an output current ID2 flowing through the NMOSQ1. In addition, the period A indicates a period with which the dimming is set at a higher brightness level, the ON period for the SW signal being relatively long, while the period B a period with which the dimming is set at a lower brightness level, the ON period for the SW signal being relatively short.

As shown in FIG. 2 (*a*), when the SW signal rises at time T1, the PMOSQ4 is brought into the on-state with the NMOSQ3 being brought into the on-state. Thereby, there is given a state in which a current in response to the output current ID1 is fed back from the secondary side to the primary side as an FB signal, however, due to the time delay of the feedback control, no FB signal is fed back from the secondary side to the primary side until time T2, as shown in FIG. 2 (*c*). Therefore, in the period from time T1 to time T2, no electric power is supplied from the primary side to the smoothing capacitor C2, thereby the LED array 2 is driven only by the electric power accumulated in the smoothing capacitor C2. However, in the first embodiment, the constant current power supply apparatus is configured such that, as shown in FIG. 2 (*d*), the output voltage Vdd (a solid line) at the time when the SW signal rises is higher than the rated voltage (a dotted line) by ΔV. Thereby, as shown in FIG. 2 (*b*), even in the period from time T1 to T2, the output voltage Vdd (a solid line) will not be lower than the rated voltage (a dotted line), the output current ID1 for driving the LED array 2 being provided as a practically constant current Is. Therefore, as shown in FIG. 2 (*c*), without the FB signal which is fed back to the primary side rapidly rising, the feedback control is conducted such that the output current ID1 is maintained, with the output voltage Vdd being maintained at the rated voltage, and the output current ID1 at the constant current Is, respectively, until, at time T4 (refer to the period A) or time T5 (refer to the period B), the SW signal falls.

The ON generation circuit 5 is a circuit for generating a one-shot pulse having a preset pulse width for a trigger which has been input, and as shown in FIG. 2 (*a'*), using the timing at which the SW signal falls, in other words, the ON period of the SW signal is terminated, as a trigger, outputs an ON signal for generating a pulse having a preset pulse width Tw which provides a replenishment period. Thereby, during the ON period for the SW signal and the period of the pulse width Tw that follows the ON period of the relevant SW signal, the PMOSQ4 will be in the on-state. Therefore, as shown in FIG. 2 (*a*), when the SW signal falls at time T4 (refer to the period A) or time T5 (refer to the period B) the NMOSQ3 is brought into the off-state, while the PMOSQ4 is maintained in the on-state during the period of the pulse width Tw, in other words, the period of time T4 to T4' (refer to the period A) or time T5 to T5' (refer to the period B) . During the relevant period, because the NMOSQ3 is in the off-state, the current output from the differential amplifier OTA is shut off by the NMOSQ3, however, by the electric power accumulated in the capacitor C3, the voltage at the time when the SW signal falls is maintained, and as shown in FIG. 2 (*c*), the FB signal is fed back from the secondary side to the primary side. Thereby, electric power is supplied from the primary side to the smoothing capacitor C2, however, with the SW signal having fallen, the LED array 2 is not driven, thereby the electric power supplied being accumulated in the smoothing capacitor C2. By the electric power accumulated in the smoothing capacitor C2 during the period of time T4 to T4' (refer to the period A) or time T5 to T5' (refer to the period B), the output voltage Vdd (a solid line) is increased by ΔV above the rated voltage (a dotted line) at time T4' (refer to the period A) or time T5' (refer to the period B) as shown in FIG. 2 (*d*). In other words, during the period of the pulse width Tw that follows the ON period of the SW signal, the electric power which is consumed for driving the LED array 2 during the period of the time delay of the feedback control at the rise of the subsequent SW signal is supplied to the smoothing capacitor C2 from the primary side. Therefore, there is provided an advantage that, during the ON period of the SW signal, the output voltage Vdd is maintained approximately at the rated voltage, and the output current ID1 approximately at the constant current Is, whereby, even in the circuit configuration of the first embodiment where a time delay is generated in the feedback control, the LED array 2, which is a load, can be driven with a constant current Is.

It is preferable that the value of the electric power to be supplied to the smoothing capacitor C2 during the period of the pulse width Tw that follows the ON period of the SW signal be approximately equal to the value of the electric power to be consumed for driving the LED array 2 during the period of the time delay of the feedback control at the rise of the SW signal, however, even if both values are slightly different from each other, the output current ID1 at the rise of the SW signal can be advantageously kept equal to the constant current Is.

(Second Embodiment)

Figure 3:
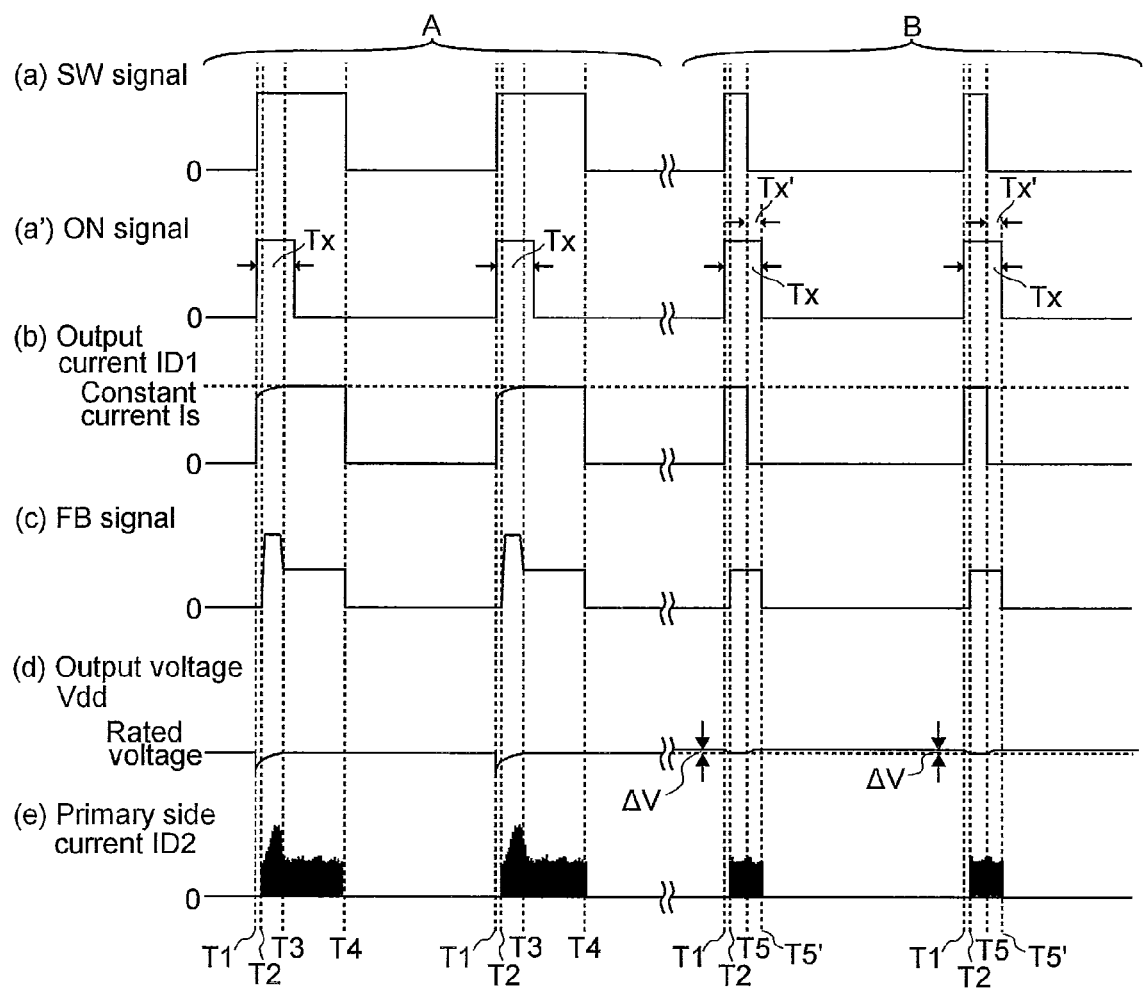
FIG. 3 is a waveform diagram illustrating signal waveforms and operation waveforms of the respective components of a second embodiment of a constant current power supply apparatus according to the present invention.

FIG. 3 illustrates signal waveforms and operation waveforms of the respective components in the second embodiment, (*a*) denoting an SW signal for driving the NMOSQ2; (*a'*) an ON signal output from the ON generation circuit 5; (*b*) an output current ID1 flowing through the LED array 2; (*c*) an FB signal fed back from the secondary side to the primary side; (*d*) an output voltage Vdd across both terminals of the smoothing capacitor C2; and (*e*) an output current ID2 flowing through the NMOSQ1. In addition, the period A indicates a period with which the dimming is set at a higher brightness level, the ON period for the SW signal being relatively long, while the period B a period with which the dimming is set at a lower brightness level, the ON period for the SW signal being relatively short.

The constant current power supply apparatus of the second embodiment has the same configuration as that of the constant current power supply apparatus of the first embodiment illustrated in FIG. 1 except for the output waveform of the ON signal output from the ON generation circuit ON, as shown in FIG. 3. In other words, the ON generation circuit ON in the second embodiment uses the timing at which the SW signal rises, in other words, the ON period of the SW signal is started, as a trigger to output an ON signal for generating a pulse having a pulse width Tx which is longer than the period from time T1 to T3 for providing a replenishment period, as shown in FIG. 3 (a'). Thereby, as indicated in the period B in FIG. 3, where the ON period of the SW signal is shorter than the period of time T1 to T3, the PMOSQ4 is in the on-state during the period of the pulse width Tx, in other words, the ON period of the SW signal, and the period of the pulse width Tx' that follows the ON period of the relevant SW signal (the period of the pulse width Tx minus the ON period of the SW signal). Therefore, as shown in FIG. 3 (a), when the SW signal falls at time T5 (refer to the period B), the NMOSQ3 is brought into the off-state, however, the PMOSQ4 is maintained in the on-state during the period of the pulse width Tx', in other words, the period of time T5 to T5' (refer to the period B). During the relevant period, because the NMOSQ3 is in the off-state, the current output from the differential amplifier OTA is shut off by the NMOSQ3, however, by the electric power accumulated in the capacitor C3, the voltage at the time when the SW signal falls is maintained, and as shown in FIG. 3 (c), the FB signal is fed back from the secondary side to the primary side. Thereby, electric power is supplied from the primary side to the smoothing capacitor C2, however, with the SW signal having fallen, the LED array 2 is not driven, thereby the electric power supplied being accumulated in the smoothing capacitor C2. By the electric power accumulated in the smoothing capacitor C2 during the period of time T5 to T5' (refer to the period B), the output voltage Vdd (a solid line) is increased by ΔV above the rated voltage (a dotted line) at time T5' (refer to the period B) as shown in FIG. 3 (d). In other words, during the period of the pulse width Tx' that follows the ON period of the SW signal, the electric power which is consumed for driving the LED array 2 during the period of the time delay of the feedback control at the rise of the subsequent SW signal is supplied to the smoothing capacitor C2 from the primary side. Therefore, there is provided an advantage that, in the case where the dimming is set at a lower brightness level, the ON period for the SW signal being relatively short, the output voltage Vdd is maintained approximately at the rated voltage, and the output current ID1 approximately at the constant current Is during the ON period of the SW signal, whereby, even in the circuit configuration of the first embodiment where a time delay is generated in the feedback control, the LED array 2, which is a load, can be driven with a constant current Is.

(Third Embodiment)

Figure 4:
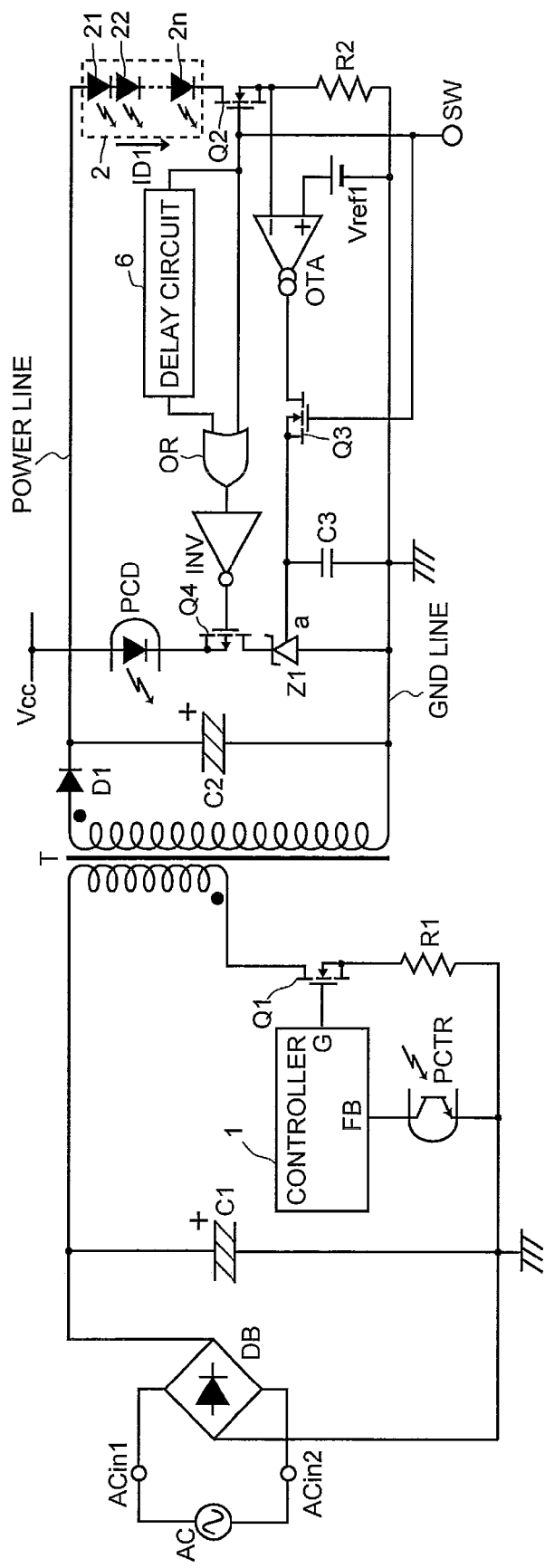
FIG. 4 is a circuit configuration diagram illustrating a circuit configuration of a third embodiment of a constant current power supply apparatus according to the present invention.

As can be seen with reference to FIG. 4, the constant current power supply apparatus of the third embodiment is different from the constant current power supply apparatus of the first embodiment in that it is provided with a delay circuit 6 in place of the ON generation circuit 5 in the configuration of the constant current power supply apparatus of the first embodiment.

Figure 5:
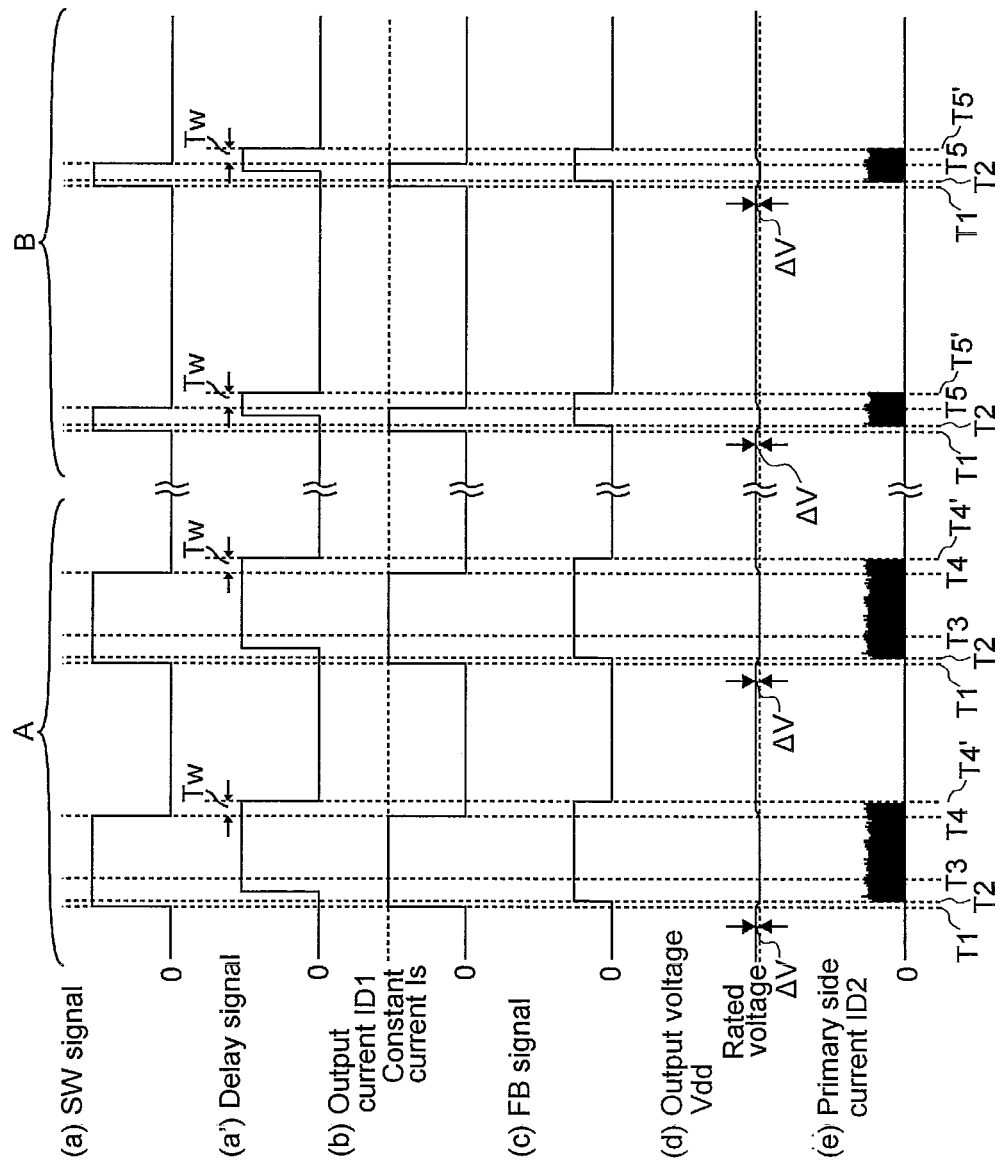
FIG. 5 is a waveform diagram illustrating signal waveforms and operation waveforms of the respective components in FIG. 4.

FIG. 5 illustrates signal waveforms and operation waveforms of the respective components, (a) denoting an SW signal for driving the NMOSQ2; (a') a delay signal output from the delay circuit 6; (b) an output current ID1 flowing through the LED array 2; (c) an FB signal fed back from the secondary side to the primary side; (d) an output voltage Vdd across both terminals of the smoothing capacitor C2; and (e) an output current ID2 flowing through the NMOSQ1. In addition, the period A indicates a period with which the dimming is set at a higher brightness level, the ON period for the SW signal being relatively long, while the period B a period with which the dimming is set at a lower brightness level, the ON period for the SW signal being relatively short.

As shown in FIG. 5 (a'), the delay circuit 6 outputs a delay signal with which the ON period of the SW signal is delayed by the time Tw. Thereby, in the same way as in the first embodiment, during the ON period for the SW signal and the period of the Tw that follows the ON period of the relevant SW signal, the PMOSQ4 is in the on-state, and by the same operation as in the first embodiment, the same advantage is provided.

In the aforementioned embodiments, an example in which the LED array 2 constituted by connecting n LEDs (n denotes a natural number), LED 21 to 2n, in series is driven as a load, however, the LED array 2 may be a single LED. In addition, the LED array 2 is not limited to LEDs, provided that it is a load which can be driven by direct current.

In addition, the present embodiment has been described with the primary/secondary isolation type converter, however, the present invention is applicable to the non-isolation type converter with no problem. Further, the present embodiment has been described with a converter using a transformer T, however, the present invention is also applicable to the non-isolation type converter, such as a step up/down chopper, and the like.

It is obvious that the present invention is not limited to any of the aforementioned embodiments, and the respective embodiments may be altered as appropriate within the scope the technological concept of the present invention. In addition, the number, location, geometry, and the like of the aforementioned component members are not limited to those in the aforementioned embodiments, and may be altered to those suitable for implementing the present invention. In the respective drawings, the same component is provided with the same reference symbol.

What is claimed is:

1. A constant current power supply apparatus, supplying electric power from a primary side to a secondary side, and using the electric power supplied to the secondary side for driving a load on/off with a SW pulse signal as an external pulse signal supplied to the secondary side under PWM control, the constant current power supply apparatus comprising:
   a feedback signal generator circuit for generating a feedback signal corresponding to an output current flowing through the load;
   a feedback circuit for feeding back the feedback signal generated in the feedback signal generator circuit from the secondary side to the primary side;
   a control circuit for controlling the supply of electric power from the primary side to the secondary side by generating a pulse signal having a pulse width in response to the feedback signal fed back by the feedback circuit; and
   a feedback period restricting circuit for adjusting the period during which the feedback signal is fed back,
   wherein
   the feedback period restricting circuit has an OR circuit which adjusts the period during which the feedback signal is fed back to the logical sum of the ON period of the SW pulse signal as an external pulse signal during which the load is driven on, and a replenishment period during which the SW pulse signal is terminated, such that the power supply current is constant during a delay period in feeding back the feedback signal.

2. The constant current power supply apparatus of claim 1, wherein, in the replenishment period other than the ON period of the pulse signal, the feedback signal generator circuit generates the feedback signal corresponding to the output current having flown through the load in the ON period of the pulse signal immediately before the replenishment period.

3. The constant current power supply apparatus of claim 1, wherein the replenishment period is a predetermined period which is generated with the timing of the termination of the ON period of the pulse signal being used as a trigger.

4. The constant current power supply apparatus of claim 1, wherein the replenishment period is a predetermined period which is generated with the timing of the start of the ON period of the pulse signal being used as a trigger.

5. The constant current power supply apparatus of claim 1, wherein the replenishment period is a period which is generated by delaying the ON period of the pulse signal.

6. The constant current power supply apparatus of claim 1, wherein, in the replenishment period other than the ON period of the pulse signal, the electric power to be used for driving the load in the period of the time delay of the feedback control that is attributable to the feedback circuit and the control circuit is supplied from the primary side to the secondary side.

7. A constant current power supply apparatus, supplying electric power from a primary side to a secondary side, and using the electric power supplied to the secondary side for driving a load on/off with a SW pulse signal as an external pulse signal supplied to the secondary side under PWM control, the constant current power supply apparatus comprising:

a feedback signal generator circuit for generating a feedback signal corresponding to an output current flowing through the load;

a feedback circuit for feeding back the feedback signal generated in the feedback signal generator circuit from the secondary side to the primary side;

a control circuit for controlling the supply of electric power from the primary side to the secondary side by generating a pulse signal having a pulse width in response to the feedback signal fed back by the feedback circuit; and a feedback period restricting circuit for adjusting the period during which the feedback signal is fed back, the feedback signal generator circuit including a differential amplifier for comparing the output current flowing through the load with a reference voltage, outputting a current according to a differential voltage therebetween, and a shunt regulator for outputting a current according to the differential voltage to the feedback circuit, the output of the differential amplifier being inputted to a control terminal of the shunt regulator in response to the pulse signal under PWM control, the feedback period restricting circuit adjusting the period during which the feedback signal is fed back, wherein the feedback period restricting circuit has an OR circuit which adjusts the period during which the feedback signal is fed back to the logical sum of the ON period of the SW pulse signal as an external pulse signal during which the load is driven on, and the replenishment period during which the SW pulse signal is terminated, such that the power supply current is constant during a delay period in feeding back the feedback signal.

\* \* \* \* \*